United States Patent [19]

Frese et al.

[11] 3,894,120

[45] July 8, 1975

[54] THERMOPLASTIC MOLDING COMPOUND COMPRISING A BLEND OF ISOTACTIC POLYBUTENES

[75] Inventors: Albert Frese; Otto Hahmann; Horst Denzel, all of Marl, Germany

[73] Assignee: Chemische Werke Huels Aktiengesellschaft, Marl, Germany

[22] Filed: Oct. 31, 1973

[21] Appl. No.: 411,394

[30] Foreign Application Priority Data
Nov. 4, 1972    Germany................................ 2254128

[52] U.S. Cl.......... 260/897 A; 260/93.7; 260/94.9 B
[51] Int. Cl. ............................................. C08f 29/12
[58] Field of Search........... 260/897 A, 93.7, 94.9 B

[56] References Cited
UNITED STATES PATENTS

| | | | |
|---|---|---|---|
| 2,882,263 | 4/1959 | Natta | 260/897 A |
| 3,356,765 | 12/1967 | Musso | 260/897 A |
| 3,362,940 | 1/1968 | Edwards | 260/93.7 |
| 3,385,817 | 5/1968 | Jones | 260/94.9 B |
| 3,634,551 | 1/1972 | Stancell | 260/897 A |

FOREIGN PATENTS OR APPLICATIONS

| | | |
|---|---|---|
| 1,915,061 | 11/1970 | Germany |
| 1,184,742 | 10/1957 | France |

*Primary Examiner*—John C. Bleutge
*Assistant Examiner*—C. J. Seccuro
*Attorney, Agent, or Firm*—Millen, Raptes & White

[57] ABSTRACT

A mixture of (a) 10–95% by weight of a highly isotactic polybutene-1 having an RSV value of 1.7 – 4.5 dl./g., a density of 0.913 – 0.920 g.cm$^3$, a yield stress of 190–240 kp./cm$^2$, and an ether-soluble content of 1–15%, and (b) 90–5% by weight of a substantially isotactic polybutene-1 having an RSV value of 1.2 – 4.5 dl./g., a density of 0.890 – 0.910 g./cm$^3$, a yield stress of 60–150 kp./cm$^2$, a tensile strength at rupture of 160–380 kp./cm$^2$, an ultimate elongation of 300–600%, and an ether-soluble content of 10–30%, is useful as a thermoplastic molding composition, especially for forming films having good transparency and tear transmission resistance in both directions.

9 Claims, No Drawings

THERMOPLASTIC MOLDING COMPOUND COMPRISING A BLEND OF ISOTACTIC POLYBUTENES

BACKGROUND OF THE INVENTION

This invention relates to isotactic polybutene-1 thermoplastic molding compositions.

Films of highly isotactic polybutene-1 have the great disadvantage that they exhibit a low transparency and fluctuating strength values, especially very differing film tear strength, i.e., tear resistance, in the longitudinal and transverse directions. For this reason, such highly isotactic polybutene-1 films are unsuitable for many fields of application.

By increasing the atactic proportion, the transparency of the polybutene-1 films can be improved only slightly. For example, if during processing that atactic proportion is not separated together with the solvent but rather left in the product by precipitation with alcohol or by evaporation of the solvent, a polybutene-1 is obtained from which, even with ether-soluble proportions of 10-20%, films are produced having only a slight improvement in transparency. The film tear strength is not improved as compared to the highly isotactic polybutene-1, and is very different in the longitudinal and transverse directions, e.g., 24.8 kp./mm. longitudinally and only 0.89 kp./mm. transversely.

Under certain polymerization conditions described in the application of Albert Frese, S. N. 400899, filed Sept. 26, 1973, it is possible to produce by solution polymerization of butene-1, employing a special catalyst system, a polybutene-1 which is suitable for film manufacture. Although this material is suitable for film production, one must accept lowered yield stress values and a reduction of Vicat temperature.

Therefore, it is an object of this invention to provide polybutene-1 compositions which form transparent films which have improved yield stress values and a higher Vicat temperature.

SUMMARY OF THE INVENTION

According to this invention, there is provided a polybutene-1 mixture of a. 10-95% by weight of a highly isotactic polybutene-1 having an RSV value of 1.7 – 4.5 dl./g., a density of 0.913 – 0.920 g./cm$^3$, a yield stress value of 190–240 kp./cm$^2$, and an ether-soluble content of 1–15%; and b. 90-5% by weight of a substantially isotactic polybutene-1 having an RSV value of 1.2 – 4.5 dl./g., a density of 0.890 – 0.910 g./cm$^3$, a yield stress value of 60–150 kp./cm$^2$, a tensile strength at rupture of 160–380 kp./cm$^2$, an ultimate elongation value of 300–600%, and an ether-soluble content of 10–30%.

In a preferred aspect, there is provided film formed of such a polybutene-1 mixture.

DETAILED DISCUSSION

The objectives of this invention are thus achieved by a mixture of two polybutene-1 of different crystallinity, viz., a highly isotactic polybutene-1 which alone is poorly suited for film production, and substantially isotactic polybutene-1 of a lower crystallinity.

The term "highly isotactic" means

| | |
|---|---|
| density | 0.913–0.920 g/cm$^3$, preferably 0.915–0.918 g/cm$^3$ |
| ether-soluble content | 1 – 15 %, preferably 1.5 – 7.5 % |
| yield stress | 190–240 kp/cm$^2$, preferably 200–230 kp/cm$^2$ |
| tensile strength at rupture | 200–400 kp/cm$^2$, preferably 300–350 kp/cm$^2$ |
| ultimate elongation | 200–400 %. preferably 250–350 % |
| Vicat temperature | 115–124°C, preferably 120–122°C |

The term "substantially isotactic" means

| | |
|---|---|
| density | 0.890–0.910 g/cm$^3$, preferably 0.895–0.908 |
| ether soluble content | 10 – 30 %, preferably 15–25 % |
| yield stress | 60 – 150 kp/cm$^2$, preferably 80 – 120 kp/cm$^2$ |
| tensile strength at rupture | 160 – 380 kp/cm$^2$, preferably 200–350 kp/cm$^2$ |
| ultimate elongation | 300 – 600 %, preferably 350 – 550 % |
| Vicat temperature | 74 – 110°C, preferably 100 – 107°C |

The mixtures of this invention preferably consist of 40–70% of the highly isotactic polybutene-1 and 60–30% of the substantially isotactic polybutene 1 of lower crystallinity.

An example of a suitable highly isotactic polybutene-1 is a polybutene-1 having an RSV value of 1.7 – 4.5 dl./g., i.e., a molecular weight of 620,000 – 2,112,000, preferably of 2.0 – 3.5 dl./g., i.e., a molecular weight of 766,000 – 1,554,000, a density of 0.913 – 0.920 g./cm$^3$, and an ether-soluble proportion of 1–15%, preferably 1.5 – 7.5%. Polymers having higher RSV values have lower ether-soluble proportions and those with lower RSV values have higher ether-soluble proportions. Such a highly isotactic polybutene-1 has a yield stress value of 190–240 kp./cm$^2$. In addition to butene-1 homopolymers, butene-1 copolymers having a comonomer content of up to about 5% can also be employed. Preferred comonomers are C$_3$ – C$_{14}$ α-olefins, e.g., propene, hexene-1, dodecene-1.

Such a highly isotactic polybutene-1 can be produced by polymerizing butene-1, optionally in the presence of up to about 5% of one or more comonomers, at a temperature of −20° to +50° C., preferably 25°–35° C., employing a mixed catalyst of titanium trichloride, on the one hand, and a dialkylaluminum chloride, on the other hand. Suitable as the butene-1 is high-percentage butene-1, as well as C$_4$-cuts containing butene-1. As the titanium trichloride, a product such as TiCl$_3$ . 0.2–0.6 AlCl$_3$ is preferably employed, as it is obtained by the reduction of titanium tetrachloride with aluminum or with alkylaluminum compounds, especially ethylaluminum sesquichloride. Diethylaluminum chloride is the preferred dialkylaluminum chloride. The polymerization is preferably accomplished in the liquid phase in suspension without added diluent.

The substantially isotactic polybutene-1 of a lower crystallinity has RSV values of 1.2 – 4.5 dl./g., preferably 2.0 – 3.5 dl./g. This corresponds to a molecular weight of 394,000 – 2,112,000, preferably 766,000 – 1,554,000. These products have a density of 0.89 – 0.91 g./cm$^3$, preferably 0.895 – 0.908 g./cm$^3$, ether-soluble proportions of 10–30%, preferably 15–25%, yield stress values of 60–150 kp./cm$^2$, preferably 80–120 kp./cm$^2$, tensile strength at rupture values of 160–380 kp./cm$^2$, and ultimate elongation values of 300–600%. In addition to butene-1 homopolymers, butene-1 copolymers having a proportion of comonomer of up to about 15%, preferred comonomers are C$_3$–C$_{14}$ α-olefins, e.g., propene, hexene-1, dodecene-1.

Such a substantially isotactic polybutene-1 is obtained by polymerizing butene-1, optionally in the presence of up to 15% of one or more comonomers, at a temperature of 55°–120° C., preferably 65°–100° C.

employing a mixed catalyst of titanium trichloride, on the one hand, and an alkylaluminum compound, on the other hand. A suitable butene-1 is high-percentage butene-1, e.g., 95 – 99%, as well as $C_4$ cuts containing, e.g., 40 – 60% butene-1. A preferred titanium trichloride is $TiCl_3 . 0.2 – 0.6\ AlCl_3$, as it is obtained by the reduction of titanium tetrachloride with aluminum or an alkylaluminum compound, preferably ethylaluminum sesquichloride. Suitable alkylaluminum compounds are trialkylaluminum compounds and aluminum dialkyl chlorides, preferably diethylaluminum chloride. The polymerization is preferably conducted in the liquid phase in solution without the addition of a further solvent.

Surprisingly, the mixtures exhibit more favorable values with respect to the Vicat temperature than could be predicted from the mixture ratio, as shown in Table I, below.

a more favorable stress crack resistance. With special stabilization, this material is especially suitable for the manufacture of degradable mulching films.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1 a. A highly isotactic polybutene-1 (Product $A_1$, density 0.9173, ether-soluble proportion 6%) is produced by the polymerization of 36 parts by weight of butene-1 (98% strength) at temperatures of 25°–30° C., a partial hydrogen pressure of 1.6 atmospheres and a total pressure of 3.5 – 4.0 atmospheres gauge with the aid of a

TABLE I

|  | Vicat A ° C. | Yield Stress kp./cm² | Density g./cm³ |
| --- | --- | --- | --- |
| Highly isotactic polybutene-1 ($A_1$) | 122 | 231 | 0.9173 |
| Substantially isotactic polybutene-1 ($B_1$) | 105 | 123 | 0.9050 |
| Mixture 60% $A_1$ and 40% $B_1$ | 119 | 188 | 0.9085 |
| Mixture 50% $A_1$ and 50% $B_1$ | 115 | 175 | 0.9079 |
| Highly isotactic polybutene-1 ($A_2$) | 120 | 217 | 0.9160 |
| Substantially isotactic polybutene-1 ($B_2$) | 74 | 72 | 0.8973 |
| Mixture 95% $A_2$ and 5% $B_2$ | 119 | 232 | 0.9157 |
| Mixture 90% $A_2$ and 10% $B_2$ | 119 | 230 | 0.9150 |
| Mixture 85% $A_2$ and 15% $B_2$ | 118 | 216 | 0.9152 |
| Mixture 70% $A_2$ and 30% $B_2$ | 113 | 190 | 0.9108 |
| Mixture 50% $A_2$ and 50% $B_2$ | 106 | 148 | 0.9034 |

The yield stress values are, in part, also higher than would be expected from the mixture ratio, whereas the density of the mixtures is partially lower than corresponds to the mixture ratio, especially in case of mixture ratios of 60 : 40 to 50 : 50. The tensile strength at rupture and ultimate elongation values are likewise largely more favorable than would be expected from the mixture ratio.

When adding substantially isotactic polybutene-1 with low yield stress values of, for example, only 72 kp./cm², as a small amount as 5% can lead to improved property values and especially to an improvement of the transparency of the film. However, even in the case of these mixtures, larger amounts of about 30–40% are preferred. In case of products having yield stress values of 80–120 kp./cm², mixtures containing 40–50% of the substantially isotactic polybutene-1 are preferred, and in case of products having yield stress values of 120–150 kp./cm², 50–70% content is preferred.

The polybutene-1 blend of this invention is excellently suitable for being processed into films, which films are heat sealable.

An advantage of these films formed from these polybutene-1 mixtures is good dimensional stability at high temperatures. The Vicat temperature is only slightly lowered, compared to the highly isotactic polybutene-1. Moreover, the films have excellent transparency, good stretchability, and improved film tear resistance, compared to films of highly isotactic polybutene-1. As contrasted to high-pressure polyethylene, this butene-1 film material has the advantage, in addition to an improved thermal dimensional stability, of exhibiting better cold flow, higher penetration, and mixed catalyst of 0.013 part by weight of a titanium trichloride (commercial aluminum-reduced titanium trichloride $TiCl_3 . 0.33\ AlCl_3$) and 0.015 part by weight of diethylaluminum monochloride.

b. A substantially isotactic polybutene-1 (Product $B_1$, density 0.9050, ether-soluble proportion 18.5%) is produced by the polymerization of 36 parts by weight of butene-1 (98% purity) at a temperature of 90° C. and under a pressure of 15–12 atmospheres gauge with the aid of a mixed catalyst of 0.0073 part by weight of diethylaluminum monochloride and 0.0066 part by weight of a $TiCl_3 . 0.5\ AlCl_3$ catalyst prepared by the dropwise addition of one mole of titanium tetrachloride (100%) at −5° C. Within 6 hours with 1.4 moles of a 20% strength hexane solution, cooled to −5° C., of ethylaluminum sesquichloride (molecular weight 123.7), with a post reaction of 15 hours at 0° C. to +10° C., a tempering step at 130° C. for 6 hours, and a subsequent separation and granulation of the catalyst precipitate.

c. The highly isotactic (Product $A_1$) and the substantially isotactic (Product $B_1$) polybutene-1 are mixed in weight ratios of 60:40 and 50:50 and then granulated. For comparison purposes, Product $A_1$ and Product $B_1$ were also granulated individually. The thus-obtained granulated products were made into blown films in a blown-film manufacturing device. All products can be readily processed. However, the films produced from Product $A_1$ have a poor transparency and an insufficient tear resistance. The films produced from Product $B_1$ and especially the mixture of Products $A_1$ and $B_1$ exhibit very good transparency. The four thus-obtained granulated products and the films produced therefrom have the properties given in Tables II and III.

TABLE II

| Polymer Properties | | $A_1$ | $B_1$ | Mixture 60% $A_1$, 40% $B_1$ | Mixture 50% $A_1$, 50% $B_1$ |
|---|---|---|---|---|---|
| RSV | dl./g. | 1.95 | 2.5 | 2.2 | 2.1 |
| $MI_{190/2.16}$ | g./10 min. | 2.8 | 1.0 | 1.6 | 1.7 |
| $MI_{190/5}$ | g./10 min. | 13.6 | 7.2 | 8.0 | 8.2 |
| Density | g./cm³ | 0.9173 | 0.9050 | 0.9085 | 0.9079 |
| Yield stress | kp./cm² | 231 | 123 | 188 | 175 |
| Tensile strength at rupture | kp./cm² | 357 | 269 | 345 | 316 |
| Ultimate elongation | % | 327 | 393 | 370 | 347 |
| Vicat A | °C. | 122 | 105 | 119 | 115 |

TABLE III

| Film Properties | | $A_1$ | $B_1$ | Mixture 60% $A_1$, 40% $B_1$ | Mixture 50% $A_1$, 50% $B_1$ |
|---|---|---|---|---|---|
| Yield stress, kp./cm² | longitudinal | 222 | 160 | 187 | 190 |
| | transverse | 222 | 107 | 213 | 162 |
| Elongation at yield stress, % | longitudinal | 16 | 16 | 16 | 16 |
| | transverse | 16 | 16 | 16 | 16 |
| Tensile strength at rupture, kp./cm² | longitudinal | 444 | 387 | 413 | 419 |
| | transverse | 233 | 267 | 333 | 276 |
| Ultimate elongation, % | longitudinal | 138 | 190 | 176 | 238 |
| | | 268 | 302 | 302 | 274 |
| Resistance Tear, kp./mm. | longitudinal | 2.4 | 14.0 | 10.5 | 11.2 |
| | transverse | 4.4 | 26.8 | 16.2 | 18.3 |
| Tensile impact test, kp.cm./cm² | longitudinal | 639 | 1065 | 1104 | 1155 |
| | transverse | 305 | 1183 | 802 | 704 |
| Tensile notch impact test, kp.cm/cm² | longitudinal | 132 | 232 | 168 | 189 |
| | transverse | 124 | 225 | 162 | 177 |
| Penetration, kp. | | 20.1 | 27.2 | 23.6 | 24.8 |
| Welding factor | | 0.4 | 0.5 | 0.6 | 0.5 |

EXAMPLE 2 a. A highly isotactic polybutene-1 (Product $A_2$, density 0.9160, 2% ether-soluble proportion) is produced by the polymerization at 35° C., of 36 parts by weight of a $C_4$-cut consisting of 53% butene-1 and the remainder butene-2 and butane, under a partial hydrogen pressure of 0.8 atmospheres and a total pressure of 4.0 – 3.5 atmospheres gauge with the aid of a mixed catalyst of 0.025 part by weight of a titanium trichloride (commercial aluminum-reduced titanium trichloride $TiCl_3 . 0.33$ $AlCl_3$) and 0.03 part by weight of diethylaluminum monochloride.

b. A substantially isotactic polybutene-1 (Product $B_2$, density 0.8973, 17.6% ether-soluble proportion, is produced by the polymerization at 80° C. of 36 parts by weight of a $C_4$-cut consisting of 53% strength butene-1 and remainder butene-2 and butane under a partial hydrogen pressure of 0.2 atmosphere and a total pressure of 9–7 atmospheres gauge with the aid of a mixed catalyst of 0.015 part by weight of diethylaluminum monochloride and 0.013 part by weight of a $TiCl_3 . 0.5$ $AlCl_3$ catalyst, produced by the reduction of 1 mole of $TiCl_4$ (100%) at 0° C. by the dropwise addition thereof within 6 hours to 1.4 moles of $Al(C_2H_5)_{1.5}Cl_{1.5}$ (20% solution in hexane), with a post reaction time of 6 hours at 0° C. to 10° C. and subsequent separation of the catalyst precipitate.

c. Product $A_2$, Product $B_2$ and mixtures thereof in the ratios shown in Table IV are granulated. The thus-obtained granulated material and the films produced therefrom have the values given in Tables IV and V.

TABLE IV

| Values for the Granulated Material | | $A_2$ | $B_2$ | 95% $A_2$ 5% $B_2$ | 90% $A_2$ 10% $B_2$ | 85% $A_2$ 15% $B_2$ | 70% $A_2$ 30% $B_2$ | 50% $A_2$ 50% $B_2$ |
|---|---|---|---|---|---|---|---|---|
| RSV | dl./g. | 3.0 | 2.8 | 2.9 | 2.9 | 2.9 | 2.8 | 2.8 |
| $MI_{190/2.16}$ | g./10 min. | 0.5 | 1.2 | 1.6 | 1.5 | 1.8 | 2.0 | 2.3 |
| $MI_{190/5}$ | g./10 min. | 3.0 | 8.4 | 8.1 | 8.0 | 10.0 | 12.3 | 14.1 |
| Density | g./cm³ | 0.9160 | 0.8973 | 0.9157 | 0.9150 | 0.9152 | 0.9108 | 0.9034 |
| Yield stress | kp./cm² | 217 | 72 | 232 | 230 | 216 | 190 | 148 |
| Tensile strength at rupture | kp./cm² | 350 | 183 | 376 | 374 | 366 | 324 | 293 |
| Ultimate elongation | % | 270 | 530 | 293 | 313 | 320 | 313 | 377 |
| Vicat A | °C. | 120 | 74 | 119 | 119 | 118 | 113 | 106 |

TABLE V

| Film Properties | | $A_2$ | $B_2$ | 95% $A_2$ 5% $B_2$ | 90% $A_2$ 10% $B_2$ | 85% $A_2$ 15% $B_2$ | 70% $A_2$ 30% $B_2$ | 50% $A_2$ 50% $B_2$ |
|---|---|---|---|---|---|---|---|---|
| Yield stress, kp./cm² | longitudinal | — | 134 | 142 | 195 | 225 | 170 | 156 |
| | transverse | 200 | 112 | 210 | 205 | 190 | 170 | 125 |
| Elongation at yield stress, % | longitudinal | — | 16 | 14 | 16 | 20 | 18 | 18 |
| | transverse | 16 | 18 | 16 | 21 | 19 | 26 | 26 |
| Tensile strength at | longitudinal | 250 | 400 | 560 | 485 | 610 | 455 | 460 |

TABLE V – Continued

| Film Properties | | A₂ | B₂ | 95% A₂ 5% B₂ | 90% A₂ 10% B₂ | 85% A₂ 15% B₂ | 70% A₂ 30% B₂ | 50% A₂ 50% B₂ |
|---|---|---|---|---|---|---|---|---|
| rupture, kp./cm² | transverse | 270 | 240 | 385 | 335 | 320 | 370 | 290 |
| Ultimate elongation, % | longitudinal | 80 | 168 | 230 | 265 | 265 | 265 | 210 |
|  | transverse | 135 | 406 | 330 | 330 | 310 | 350 | 330 |
| Resistance | longitudinal | 2.4 | 12.1 | 8.6 | 9.1 | 9.4 | 11.9 | 14.5 |
| Tear, kp./mm. | transverse | 1.2 | 20.3 | 15.9 | 16.2 | 14.0 | 24.8 | 28.6 |
| Tensile impact test, kp.cm./cm² | longitudinal | 1125 | 1020 | 2010 | 975 | 2215 | 2135 | 1065 |
|  | transverse | 306 | 960 | 1135 | 1145 | 905 | 1145 | 945 |
| Tensile notch impact test, kp.cm./cm² | longitudinal | 126 | 210 | 280 | 230 | 550 | 290 | 450 |
|  | transverse | 112 | 186 | 235 | 200 | 210 | 240 | 220 |
| Penetration, kp. | | 20.4 | 26.5 | 20.7 | 21.4 | 22.3 | 23.1 | 24.6 |
| Welding factor | | 0.3–0.4 | 0.5 | 0.4 | 0.5 | 0.5 | 0.6 | 0.6 |

The preceding examples can be repeated with similar success by substituting the generically or specificallly described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An isotactic polybutene-1 mixture suitable for processing into heat sealable films with good dimensional stability at high temperatures, good transparency and tear transmission resistance in both directions, consisting essentially of:

a. 10–95% by weight of a highly isotactic polybutene-1 having an RSV value of 1.7–4.5 dl/g., a density of 0.913–0.920 g./cm³, an ether-soluble content of 1–15%, a yield stress of 190–240 kp/cm², a tensile strength at rupture of 200–400 kp/cm², an ultimate elongation of 200–400% and a Vicat temperature of 115°–124° C.; and correspondingly b. 90–5% by weight of a substantially isotactic polybutene-1 having an RSV value of 1.2–4.5 dl/g., a density of 0.890–0.910 g./cm³, an ether-soluble content of 10–30%, a yield stress of 60–150 kp/cm², a tensile strength at rupture of 160–380 kp/cm², an ultimate elongation of 300–600% and a Vicat temperature of 74°–100° C.

2. An isotactic polybutene-1 mixture according to claim 1, wherein:

a. said highly isotactic polybutene-1 has an RSV value of 2.0–3.5 dl.g., a density of 0.915–0.918 g/cm³, an ether-soluble content of 1.5–7.5%, a yield stress of 200–230 kp/cm², a tensile strength at rupture of 300–350 kp/cm², an ultimate elongation of 250–350% and a Vicat temperature of 120°–122° C; and b. said substantially isotactic polybutene-1 has an RSV value of 2.0–3.5 dl/g., a density of 0.895–0.908 g/cm³, an ether soluble content of 15–25%, a yield stress of 80–120 Kp/cm², a tensile strength at rupture of 200–350 kp/cm², an ultimate elongation of 350–500% and a Vicat temperature of 100°–107° C.

3. An isotactic polybutene-1 mixture according to claim 2, comprising 40–70% of component (a) and correspondingly 60–30% of component (b).

4. An isotactic polybutene-1 mixture according to claim 3, comprising 50–60% of component (a) and correspondingly 50–40% of component (b).

5. A film formed of an isotactic polybutene-1 mixture according to claim 4.

6. The mixture according to claim 1 of 40–70% of (a) and 60–30% of (b).

7. The mixture according to claim 1 wherein the highly isotactic polybutene-1 has an RSV value of 2.0 – 3.5 dl./g. and an ether soluble portion of 1.5 – 7.5%.

8. The mixture according to claim 1 wherein the substantially isotactic polybutene-1 has an RSV value of 2.0–3.5 dl./g., a density of 0.895 – 0.908 g./cm³, a yield stress value of 80–120 kp./cm² and an ether soluble content of 15–25%.

9. A film formed of a polybutene-1 mixture according to claim 6.

* * * * *